(12) United States Patent
Storbeck et al.

(10) Patent No.: US 9,641,067 B2
(45) Date of Patent: May 2, 2017

(54) SINGLE-POLE SWITCHING UNIT FOR LIMITING THE ENERGY FLOW IN A SERIES CIRCUIT COMPRISING PHOTOVOLTAIC MODULES, PHOTOVOLTAIC MODULE ARRANGEMENT AND PHOTOVOLTAIC MODULE

(71) Applicant: SolarWorld Innovations GmbH, Freiberg (DE)

(72) Inventors: Olaf Storbeck, Dresden (DE); Michael Wolf, Freiberg (DE); Matthias Georgi, Dresden (DE)

(73) Assignee: Solarworld Innovations GmbH, Freiberg (DE)

( * ) Notice: Subject to any disclaimer, the term of this patent is extended or adjusted under 35 U.S.C. 154(b) by 1016 days.

(21) Appl. No.: 13/875,349

(22) Filed: May 2, 2013

(65) Prior Publication Data
US 2013/0313909 A1 Nov. 28, 2013

(30) Foreign Application Priority Data

May 22, 2012 (DE) .................. 10 2012 104 384

(51) Int. Cl.
  *H02M 3/04* (2006.01)
  *H02J 1/06* (2006.01)
  *H02J 3/38* (2006.01)

(52) U.S. Cl.
  CPC .............. *H02M 3/04* (2013.01); *H02J 1/06* (2013.01); *H02J 3/383* (2013.01); *Y02E 10/563* (2013.01); *Y10T 307/685* (2015.04)

(58) Field of Classification Search
  CPC ... H02M 3/04; H02J 3/383; H02J 1/06; Y10T 307/685; Y02E 10/563

(Continued)

(56) References Cited

U.S. PATENT DOCUMENTS

2009/0141522 A1\* 6/2009 Adest .................. H02J 1/102
  363/55
2009/0182532 A1\* 7/2009 Stoeber .............. G08B 13/1436
  702/183

(Continued)

FOREIGN PATENT DOCUMENTS

CN    102447396 A  * 5/2012
DE  202006007613 U1    9/2006

(Continued)

OTHER PUBLICATIONS

English language abstract of DE 102005018173A1 of Oct. 26, 2006.

(Continued)

*Primary Examiner* — Jared Fureman
*Assistant Examiner* — Michael Warmflash
(74) *Attorney, Agent, or Firm* — Viering, Jentschura & Partner

(57) ABSTRACT

In various embodiments, a single-pole switching unit for limiting the energy flow in a series circuit having photovoltaic modules by a pulsating control signal present on at least one DC line is provided. The switching unit may include: a switching element, which is designed to reduce the current flow in the at least one DC line of the photovoltaic modules; a transmission element, which is designed to couple out an electrical control signal present on the DC line and to control the switching element merely with the energy of the coupled-out control signal; and a coupling element, which is arranged in parallel with the switching element and which conducts the control signal through the switching unit when the switching element is nonconducting.

20 Claims, 7 Drawing Sheets

(58) Field of Classification Search
USPC .......................................................... 307/112
See application file for complete search history.

(56) References Cited

U.S. PATENT DOCUMENTS

| | | | |
|---|---|---|---|
| 2012/0007429 A1 | 1/2012 | Hantschel et al. | |
| 2012/0053867 A1* | 3/2012 | Dunn | H02S 50/10 702/58 |
| 2012/0126629 A1* | 5/2012 | Georgi | H01L 31/02021 307/86 |
| 2013/0057989 A1* | 3/2013 | Victor | H01L 31/02021 361/42 |

FOREIGN PATENT DOCUMENTS

| | | |
|---|---|---|
| DE | 102005018173 A1 | 10/2006 |
| DE | 102006060815 A1 | 6/2008 |
| DE | 102008003272 A1 | 7/2009 |
| DE | 102010017746 A1 | 11/2011 |
| DE | 102011050468 A1 | 11/2012 |
| WO | 2004107543 A2 | 12/2004 |
| WO | 2010078303 A2 | 7/2010 |
| WO | WO 2010078303 A2 * 7/2010 ....... H01L 31/02021 |  |

OTHER PUBLICATIONS

English language abstract of DE 202006007613U1 of Sep. 21, 2006.
English language abstract of DE 102006060815A1 of Jun. 19, 2008.
Chinese Office Action based on Application No. 201310296427.6(7 pages) dated Jul. 7, 2015 (Reference Purpose Only).
Chinese Office Action based on Application No. 201310296427.6(8 Pages) dated Mar. 24, 2016 (Reference Purpose Only).

* cited by examiner

SINGLE-POLE SWITCHING UNIT FOR LIMITING THE ENERGY FLOW IN A SERIES CIRCUIT COMPRISING PHOTOVOLTAIC MODULES, PHOTOVOLTAIC MODULE ARRANGEMENT AND PHOTOVOLTAIC MODULE

CROSS-REFERENCE TO RELATED APPLICATION

This application claims priority to German Patent Application Serial No. 10 2012 104 384.1, which was filed May 22, 2012, and is incorporated herein by reference in its entirety.

TECHNICAL FIELD

Various embodiments relate to a single-pole switching unit for limiting the energy flow in a series circuit having photovoltaic modules, a photovoltaic module arrangement and a photovoltaic module.

BACKGROUND

In the event of a fault in or during maintenance of a photovoltaic system, it is not possible to interrupt a photovoltaic system which is exposed to light in such a way that the individual strings of photovoltaic modules now only produce a voltage below the so-called protection voltage. Disconnection of the feed from the grid results in the photovoltaic module strings transferring to no-load operation and thus a system voltage of up to 1000 Vdc may be established.

In order to counteract this situation, various proposals have been developed:

DE 10 2005 018 173 B4 discloses limiting the energy output of a complete generator field at the entry point into the building. This means that hazardous voltages outside the building cannot be avoided.

Furthermore, DE 20 2006 007 613 U1 describes incorporating thermal fuses into the connecting lines between the photovoltaic modules. However, this does not have any effect which is necessarily and simultaneously for the entire generator field.

In addition, DE 10 2006 060 815 A1 describes integration of switching elements in the so-called junction boxes of photovoltaic modules which, in the event of a fire, limit an energy output of all of the photovoltaic modules at the same time and thus avoid a hazardous voltage.

In addition, according to DE 10 2008 003 272 A1, signal transmission may take place with modulation over the DC connecting lines or over a separate signal line or by radio transmission.

Furthermore, it is known from WO 2004/107543 A2 to disconnect photovoltaic modules manually for installation and maintenance purposes with a control signal.

Finally, DE 10 2010 017 746 A1 describes dividing the series circuit in order to get down below a protection voltage of 60 V. This results in a combination of a series circuit and a parallel circuit for transporting the signal even in the case of isolated photovoltaic module strings. However, one problem here consists in the use of the proposed technology with different impedances of the connected system. Furthermore, the operating costs for the monitoring unit decrease the yield of such a system.

SUMMARY

In various embodiments, a single-pole switching unit for limiting the energy flow in a series circuit having photovoltaic modules by a pulsating control signal present on at least one DC line is provided. The switching unit may include: a switching element, which is designed to reduce the current flow in the at least one DC line of the photovoltaic modules; a transmission element, which is designed to couple out an electrical control signal present on the DC line and to control the switching element merely with the energy of the coupled-out control signal; and a coupling element, which is arranged in parallel with the switching element and which conducts the control signal through the switching unit when the switching element is nonconducting.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

Various embodiments achieve an interruption or reduction in the direct current flow of a plurality of or all of the photovoltaic modules in a series circuit and guiding of a control signal over the DC line of the photovoltaic modules.

In the following detailed description, reference is made to the attached drawings which form part of this description and in which specific embodiments are shown for illustrative purposes, in which the invention can be implemented. In this regard, directional terminology such as, for example, "top", "bottom", "front", "rear", etc. is used with reference to the orientation in the described figure(s). Since components of embodiments can be positioned in a number of different orientations, the directional terminology is used for illustrative purposes and is in no way restrictive. It goes without saying that other embodiments can be used and structural or logical changes can be made without deviating from the scope of protection of the present application. It goes without saying that the features of the various embodiments described herein can be combined with one another if not specifically mentioned otherwise. The following detailed description is therefore not to be interpreted in a restrictive sense, and the scope of protection of the present invention is defined by the appended claims.

Within the scope of this description, the terms "connected" and "coupled" are used for describing both a direct connection and an indirect connection and a direct or indirect coupling. Identical or similar elements have been provided with identical reference symbols in the figures, in so far as this is expedient.

Figure 1:
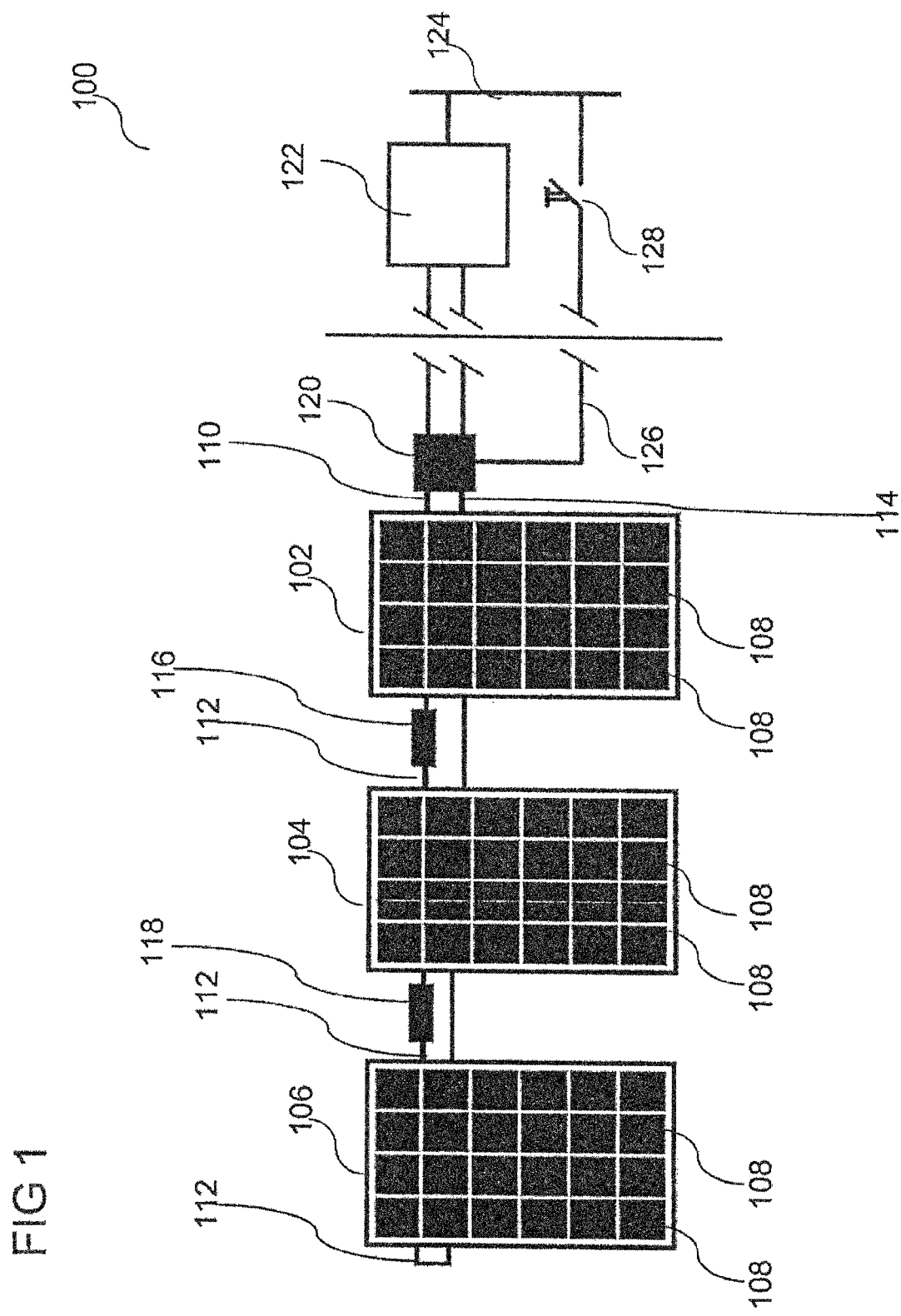
FIG. 1 shows a photovoltaic module arrangement in accordance with various embodiments.

FIG. 1 shows a photovoltaic module arrangement 100 in accordance with various embodiments.

The photovoltaic module arrangement 100 may include a plurality of series-connected photovoltaic modules 102, 104, 106. In various embodiments, any desired number of photovoltaic modules 102, 104, 106 can be provided, which can be connected in series and form so-called photovoltaic module strings, for example. The photovoltaic module arrangement 100 can be installed on a roof of a building or on another support element, for example.

Each of the photovoltaic modules 102, 104, 106 may include a large number of series-connected and/or parallel-connected photovoltaic cells (for example solar cells) 108.

A solar cell is understood in various embodiments to mean a device which converts light energy (for example at least some of the light in the visible wavelength range of approximately 300 nm to approximately 1150 nm, for example sunlight) directly into electrical energy by means of the so-called photovoltaic effect.

Various embodiments relate to crystalline semiconductor substrates as solar cell substrates, for example consisting of silicon, even if alternative embodiments may include other semiconductor substrates as solar cell substrates, for example those including or consisting of GaAs, GaN, InP or the like. Polycrystalline semiconductor substrates may also be provided as solar cell substrates. The type of technology on which the respective solar cell is based is in principle as desired within the scope of the various embodiments.

A first photovoltaic module 102 is coupled to an input connection 110 of the series circuit including the photovoltaic modules 102, 104, 106 by means of at least one DC line 112. The at least one DC line 112 therefore connects the photovoltaic modules 102, 104, 106 electrically to one another, as is illustrated. At the end of the series circuit including the photovoltaic modules 102, 104, 106, i.e. at the output connection of the third photovoltaic module 106, the at least one DC line 112 is again coupled to an input connection of the third photovoltaic module 106 and, whilst connecting the other photovoltaic modules 104, 102, is routed to an output connection 114 of the series circuit including the photovoltaic modules 102, 104, 106.

Furthermore, the photovoltaic module arrangement 100 includes at least one switching unit 116, 118 which is connected into the at least one DC line 112, as will be explained in more detail below. In various embodiments, in each case one switching unit 116, 118 is connected between two photovoltaic modules 102, 104, 106 which are directly adjacent to one another. Thus, for example, a first switching unit 116 can be connected into the DC line 112 between the first photovoltaic module 102 and a second photovoltaic module 104. A second switching unit 118 can be connected into the DC line 112 between the second photovoltaic module 104 and the third photovoltaic module 106. Alternatively, however, provision can also be made for a plurality of photovoltaic modules to be connected directly to one another without a switching unit 116, 118 being connected between said photovoltaic modules. Thus, for example, a switching unit 116, 118 can be connected into the connecting line 112 every two or every three or every four or more photovoltaic modules, wherein the switching units 116, 118 can be connected into the connecting line 112 at regular intervals or at irregular intervals between the photovoltaic modules.

Furthermore, a control device 120 (for example implemented by means of a circuit, for example hard-wired logic, or by means of a programmable processor, for example a programmable microprocessor) is provided which is coupled to the input connection 110 of the series circuit.

The control device 120 is designed to generate an electrical control signal for controlling the switching unit(s) 116, 118 and to modulate this control signal, which is a pulsed electrical control signal, for example, onto the at least one DC line 112. The control device 120 is electrically conductively connected both to the input connection 110 of the series circuit and to the output connection 114 of the series circuit. Furthermore, the control device 120 can be electrically conductively connected to an inverter 112, which for its part can be electrically conductively connected to an AC voltage grid 124, for example the public power supply grid 124.

A DC voltage, for example with a voltage level of 12 VDC or with a different desired DC voltage level, is present on that side of the inverter 122 which includes the photovoltaic modules 102, 104, 106. An AC voltage, for example with a voltage level of 230 VAC or another conventional or desired AC voltage level, for example AC grid voltage, is present on the other side of the inverter 122, which is connected to the AC voltage grid 124.

In addition, the AC voltage grid 124 can be electrically conductively connected to the control device 120 in order to supply power to the control device 120, for example by means of a further line 126, into which a safety switch 128 can be connected.

Figure 2:
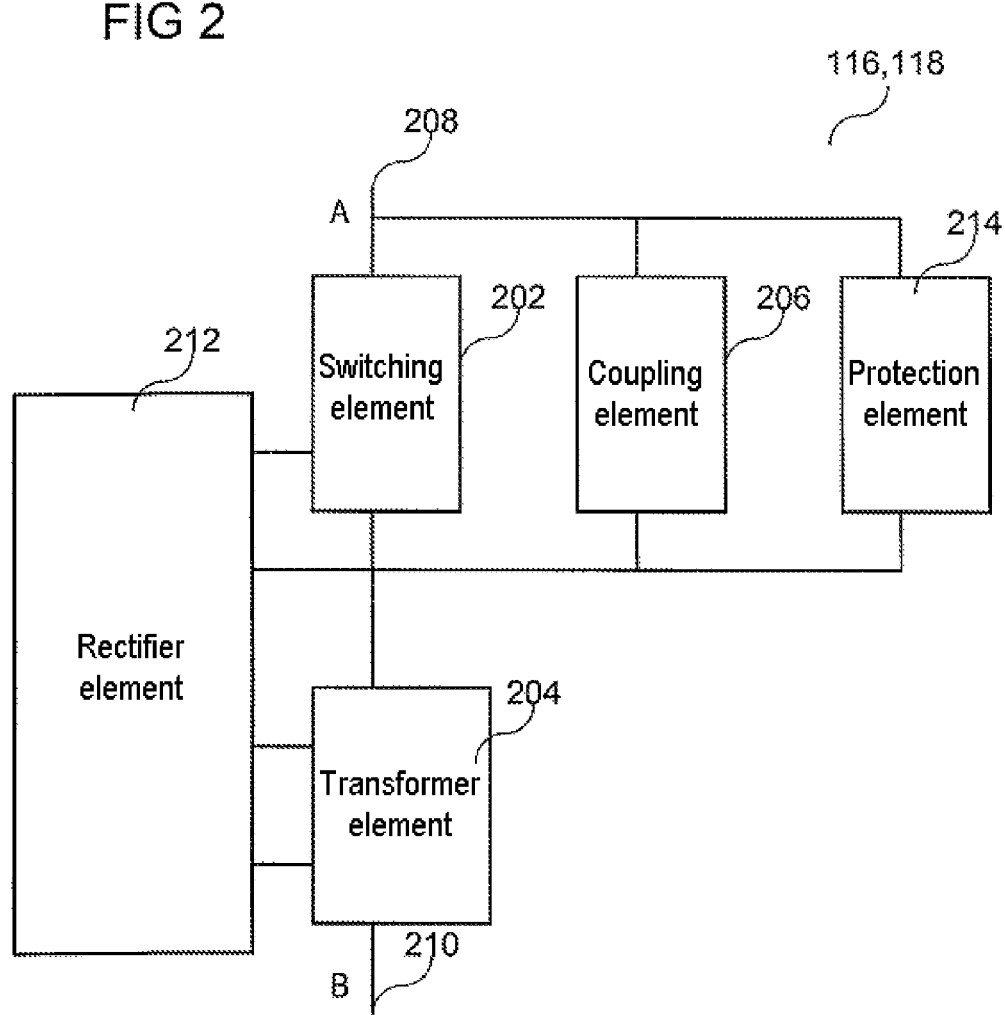
FIG. 2 shows a switching unit in accordance with various embodiments.

FIG. 2 shows a switching unit 116, 118 in accordance with various embodiments.

The switching unit 116, 118 can be designed as a single-pole switching unit for limiting the energy flow in a series circuit including photovoltaic modules by a pulsating control signal present on at least one DC line. The switching unit 116, 118 may include a switching element 202, which is designed to reduce the current flow in the at least one DC line 112 of the photovoltaic modules 102, 104, 106. Furthermore, a transmission element 204 is provided in the switching unit 116, 118, which transmission element is designed to couple out an electrical control signal present on the DC line and to control the switching element 202 merely with the energy of the coupled-out control signal. In addition, the switching unit 116, 118 includes a coupling element 206, which is arranged in parallel with the switching element 202 and which conducts the control signal through the switching unit 116, 118 when the switching element 202 is nonconducting.

A first connection 208 of the switching unit 116, 118 is coupled to a first reference potential, for example to the positive potential connection which is coupled to the input connection 110 of the series circuit. A second connection 210 of the switching unit 116, 118 is coupled to a second reference potential, for example to the negative potential connection, which is coupled to the output connection 114 of the series circuit.

The switching element 202, for example implemented in the form of a field-effect transistor switch FET (see FIG. 3), is electrically conductively connected to the first connection 208. Thus, for example, the drain connection of the field-effect transistor switch FET can be electrically conductively connected to the first connection 208. In various embodiments, the switching element 202 used can be a MOSFET (metal-oxide field-effect transistor) or an IGBT (insulated gate bipolar transistor). When selecting the respective component for the switching element, care should be taken to ensure that, firstly, it should have a very low on-state resistance in order to achieve a low power loss during normal operation. Secondly, drive power for the switching element 202 which is as low as possible is desirable because the drive power is taken from the control signal.

Figure 3:
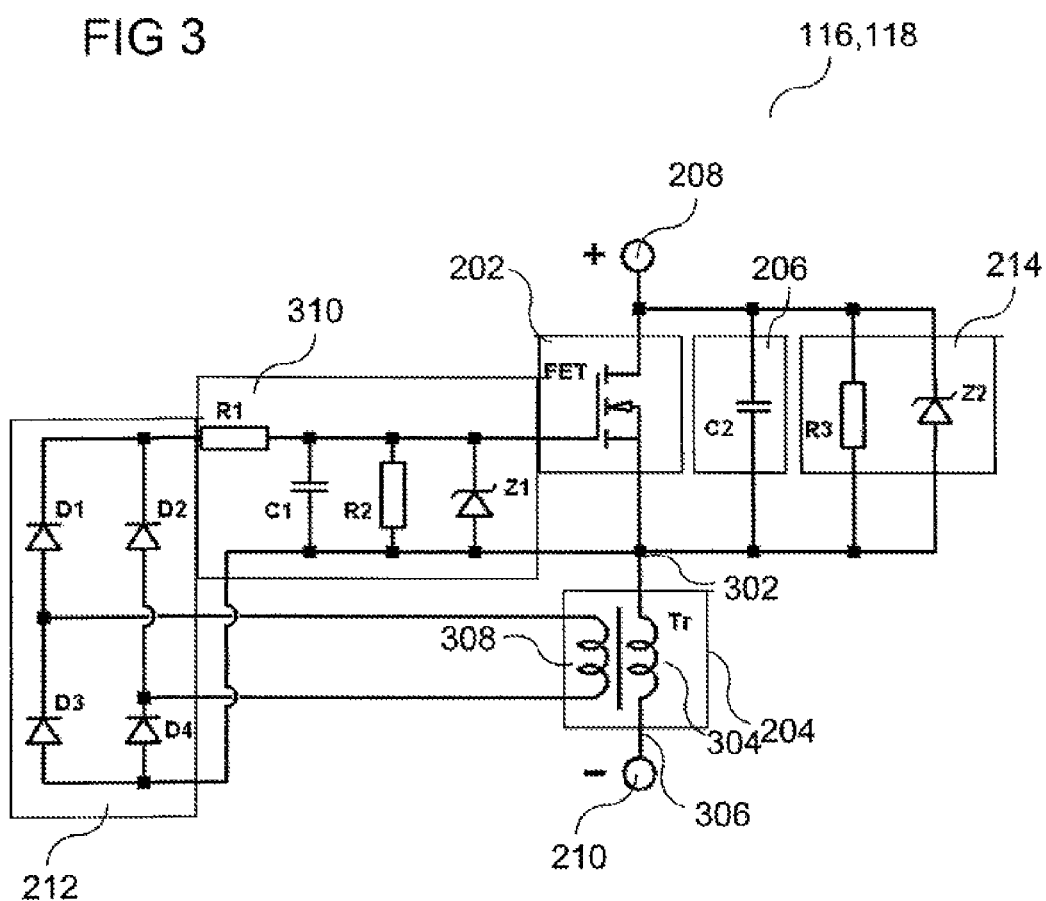
FIG. 3 shows a possible implementation in terms of circuitry of the switching unit in accordance with various embodiments.

The transmission element 204 can be formed by means of a transformer Tr, as illustrated in FIG. 3, wherein a first connection 302 of a primary winding 304 of the transformer Tr can be electrically conductively connected to a second connection of the switching element 202, for example to the source connection of the field-effect transistor switch FET, and wherein a second connection 306 of the primary winding 304 of the transformer Tr can be electrically conductively connected to the second connection 210. A secondary winding 308 of the transformer Tr can be electrically conductively connected to an optionally provided rectifier element 212 of the switching unit 116, 118. The rectifier element 212 can be implemented in any desired conventional manner, for example by means of a full-bridge circuit (for example including four diodes D1, D2, D3, D4 interconnected to form a full bridge, as illustrated in FIG. 3) or by means of a half-bridge circuit. The transmission element 204 (also referred to as transformer element 204) has, as illustrated, the object of isolating, for example DC-isolating, the pulses of the control signal from the DC path. For this purpose, a transformer with or without a ferrite core can be used. The conductor loop located in the DC path should have a very low resistance in order to achieve a low power loss during normal operation. For this reason, this conductor loop can be selected to be very short and can have a high cross section of several square millimeters. The opposite side of the transformer can have a low conductor cross section, but has many more turns (n>10) in order for the pulses of the control signal to be transformed to a usable voltage level.

The coupling element 206 can be implemented, for example, by means of a capacitor C2. In various embodiments, the capacitor C2 can have a capacitance in a range of approximately 10 nF to approximately 10 µF.

Furthermore, a protection element 214 can optionally be provided in a switching unit 116, 118, which protection element can be connected in parallel with the switching element 202 and the coupling element 206. As illustrated in FIG. 3, the optional protection element 214 can be realized by means of a reverse-biased diode, for example a reverse-biased Zener diode Z2. Furthermore, the protection element 214 may also includes a parallel-connected ohmic resistor R3. In various embodiments, the ohmic resistor R3 can have a value in a range of from approximately 500 kohm to approximately 10 Mohm.

Furthermore, a smoothing circuit 312 can optionally be provided in the switching unit 116, 118, which moving circuit can be connected between the rectifier element 212 and a control input of the switching element 202, for example a gate connection of the field-effect transistor FET. A further ohmic resistor R1 can be connected into the connecting line between the smoothing circuit 312 and the control input of the switching element 202. Furthermore, a parallel circuit including a further capacitor C1, an additional ohmic resistor R2 and a further diode Z1, for example a further Zener diode Z1, can be provided as part of the smoothing circuit 312 between the control input of the switching element 202 and the first connection 302 of the primary winding 304 of the transformer Tr. In various embodiments, the ohmic resistor R1 can have a value in a range of from approximately 50 ohm to approximately 1 kohm. In addition, the further capacitor C1 can have a capacitance in a range of from approximately 500 pF to approximately 50 nF. The rectifier element 212, as illustrated, converts the pulses of the control signal into a DC voltage. For this purpose, a rectifier circuit which is conventional per se (one-way, two-way or bridge circuit) can be used as rectifier element 212. An RC circuit which is conventional per se (the smoothing circuit 312 in the figure) for smoothing the rectified pulses is arranged downstream of the rectifier element 212, as will be explained further below. The voltage across the smoothing capacitor C1 switches the switching element. In various embodiments, an ohmic resistor R2 is arranged in parallel with the smoothing capacitor C1, said ohmic resistor discharging the smoothing capacitor C1 within a determined short period of time when the control signals are absent in order that the switching element 202 turns off. In order to protect the switching element 202, a voltage-limiting diode Z1, etc. may additionally be arranged in parallel with the smoothing capacitor C1.

As illustrated, the electrical control signal which has been modulated onto the connecting line 112 by the control device 120 is therefore provided as electrical current in the primary winding of the transformer element 204, for example the transformer Tr, when the switching element 202 is closed (i.e. when, for example, the field-effect transistor FET is conductive). The electrical current in the primary winding induces an electrical current in the secondary winding of the transformer element 204, for example the transformer Tr. The induced electrical current (which is DC-decoupled from the electrical current on the connecting line 112) is rectified by means of the rectifier element 212, possibly smoothed and then supplied to the control input of the switching element 202, with the result that the switching element 202 is still kept closed.

If, however, a corresponding electrical control signal is no longer modulated onto the connecting line 112 by means of the control device 120, an electrical current is no longer induced as AC signal by means of the transformer element 204 on the secondary side thereof, with the result that an electrical signal with a sufficient amplitude is no longer present on the secondary side of the transformer element 204 and therefore at the control connection of the respective switching element 202, i.e. the gate connection of the field-effect transistor FET, for example, whereby the switching element 202 is opened (for example the field-effect transistor FET is switched so as to be electrically nonconductive). Therefore, in various embodiments, a so-called active signalling is used by the control device 120 for actuating the switching elements 202.

If the pulses of the control signal are now absent, pulses are no longer rectified and the voltage across the smoothing capacitor C1 decreases since said smoothing capacitor is discharged by the ohmic resistor R2 connected in parallel.

Therefore, all of the switching elements 202 turn off independently of one another, but virtually simultaneously, and the current in the DC path 112 is interrupted or reduced to a value which is not hazardous (to humans). If the pulses of the control signal are present again later, said pulses would nevertheless not be rectified since the switching elements 202 are still turned off.

For this reason, the coupling element 206, which conducts the pulses of the control signal via the turned-off switching element 202, is arranged in parallel with the switching element 202. In various embodiments, for this purpose, a capacitor C2 (also referred to below as coupling capacitor C2) is used. The coupling capacitor C2 should be dimensioned such that it transmits sufficient energy in order for it to be possible for the smoothing capacitor C1 to be charged and for the switching element 202 to be actuated. For example, an ohmic resistor R3 is arranged in parallel with the coupling capacitor C2, said ohmic resistor ensuring that there is a uniform voltage distribution when the switching element 202 is turned off. In addition, a voltage-limiting diode Z2 may be arranged in parallel with the coupling capacitor C2 and the switching element 202, which voltage-limiting diode has the function of protecting the switching element 202 from peak voltages which are brought about by a switching element 202 which turns off earlier in the DC path.

Depending on the tolerances of the components in the switching unit 116, 118, a switching unit 116, 118 in the photovoltaic module string will turn off first. In this switching unit 116, 118, the total string voltage and the string current still flowing are applied to the switching element 202 for a short period of time. In accordance with the formula P=U*I, a power loss of several kW can thus occur for a very short period of time.

Since the switching unit 116, 118 performs a safety function, increased requirements in terms of reliability apply for the switching unit 116, 118. Therefore, a powerful suppressor diode Z2 is arranged in parallel with the respective switching element 202, which suppressor diode is thermally much less sensitive than the switching element 202.

Furthermore, increased reliability is achieved by virtue of the restriction to few discrete components and by dispensing with integrated circuits.

The coupling element 206 enables the transmission of a control signal in the form of an AC voltage signal in parallel (modulated) with the switching element 202, which is designed for transmitting a DC voltage signal.

The protection element 214 is used for protecting the switching element 202 and/or the coupling element 206 from an excessively high electrical voltage.

This single-pole switching device therefore makes it possible to achieve a switch which provides optional electrical isolation of a respective photovoltaic module 102, 104, 106 from the connecting line 112 by means of an AC voltage signal which has been modulated onto the DC voltage signal in order thus to reduce the electrical current present on the connecting line 112 to a value which is nonhazardous to humans, for example to a value in a range of from approximately 2 mA to approximately 10 mA, and to reduce the electrical voltage present on the connecting line 112 to a value which is nonhazardous to humans, for example to a value in a range of from approximately 60 V to approximately 120 V.

The circuit is characterized by its simplicity and compactness and therefore increases the reliability of the protection mechanism of a photovoltaic module arrangement in the event of a fault or during maintenance.

In various embodiments, a switching unit for interrupting the direct current flow in a series circuit of photovoltaic modules with a control signal can be provided, said switching unit including a transformer element and a rectifier element and a switching element. The active control signal can have a pulse train and the switching unit cannot interrupt the direct current flow when the control signal is active, and the inactive control signal cannot have a pulse train and therefore the switching unit can interrupt the direct current flow when the control signal is inactive.

The control signal can be (DC−) isolated from the DC path (for example the connecting line 112) by means of a transformer element and can be converted into a DC voltage by means of a rectifier element.

In addition, the control signal can be guided via the DC path to be interrupted and the switching element can be bypassed by means of a coupling element.

A discharging element as part of a protection element can be arranged in parallel with the coupling element. In addition, a voltage-limiting element as part of a protection element can be arranged in parallel with the coupling element.

When the control signal is active, the switching unit can have an on-state resistance of a few milliohms (<20 mohm). When the control signal is inactive, the switching unit can have a current flow of less than one microampere.

Furthermore, the switching unit can be integrated in a junction box of a photovoltaic module (for example on the rear side of a respective photovoltaic module) or can form a separate component part, which can be inserted into the DC line between two photovoltaic modules (even retrospectively).

As has been described above, in various embodiments the switching unit can interrupt the direct current flow when the control signal is absent (failsafe).

In addition, the switching unit can have a very low on-state resistance when the control signal is active in order that the power loss in the switching unit is low (this can result in a low degree of structural complexity and a high degree of reliability). When the control signal is active, the switching unit can have a very low on-state resistance in order that the direct current is impeded to a low level (this can result in a slight reduction in yield). When the control signal is inactive, the switching unit can have a very high on-state resistance in order that the residual current flowing remains in a range which is nonhazardous to humans.

An advantage of various embodiments can be considered to consist in that the switching unit only includes a few components (this means low production costs, a small space requirement and a high degree of reliability).

In various embodiments, the switching unit can also be used to quench an arc which may be present in the DC path with a cyclic control signal.

In various embodiments, a switching unit is provided for interrupting or reducing the direct current flow of all of the photovoltaic modules in a series circuit including a plurality of photovoltaic modules and for guiding the control signal via the DC line of the photovoltaic modules.

Figure 4:
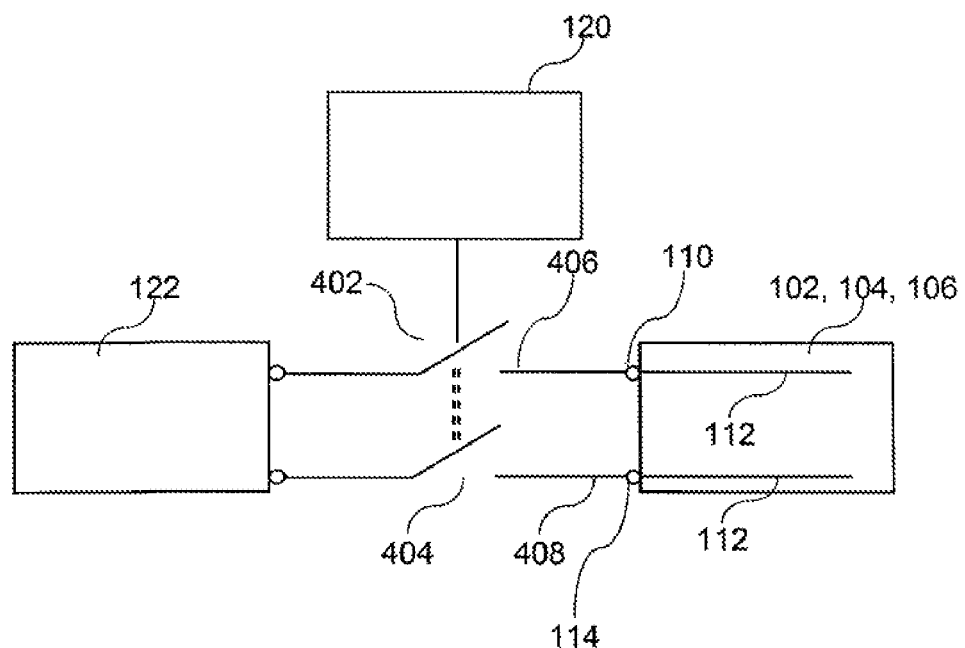
FIG. 4 shows part of a photovoltaic module arrangement in accordance with various embodiments.

FIG. 4 shows part of a photovoltaic module arrangement 100 in accordance with various embodiments. This part can be provided independently of or together with the embodiments illustrated in FIG. 2 and FIG. 3.

As illustrated in FIG. 4, in various configurations, the photovoltaic module arrangement may include switches 402, 404. A first switch 402 is connected in series into a first line 406, which for its part is electrically conductively connected at a first end to the input connection 110 of the series circuit including the photovoltaic modules 102, 104, 106 by means of a first connection. A second switch 404 is connected in series into a second line 408, which for its part is electrically conductively connected at the first end to the output connection 114 of the series circuit including the photovoltaic modules 102, 104, 106 by means of a second connection. At a second end of the lines 406, 408 which is opposite the first end, said lines are electrically conductively connected to the inverter.

The controller 120 is connected to control connections of the switches 402, 404, with the result that the controller 120 can open or close the switches 402, 404 by means of one or more switch control signals, with the result that, for example, the inverter 122 can be electrically isolated from the series circuit including the photovoltaic modules 102, 104, 106 (when the switches 402, 404 are open) or can be electrically conductively connected thereto (when the switches 402, 404 are closed). The switches 402, 404 can be realized as relays 402, 404, for example. Furthermore, the switches 402, 404 can be realized in such a way that isolation of the lines 406, 408 at all poles is achieved. As illustrated, therefore, the control unit 120 regulates the isolation of both lines 406, 408 on the DC side of the photovoltaic arrangement 100. The isolation takes place in this case by means of relays 402, 404, for example. In this case, the opening of the connection can be coupled to the opening of all switching units 116, 118.

Figure 5:
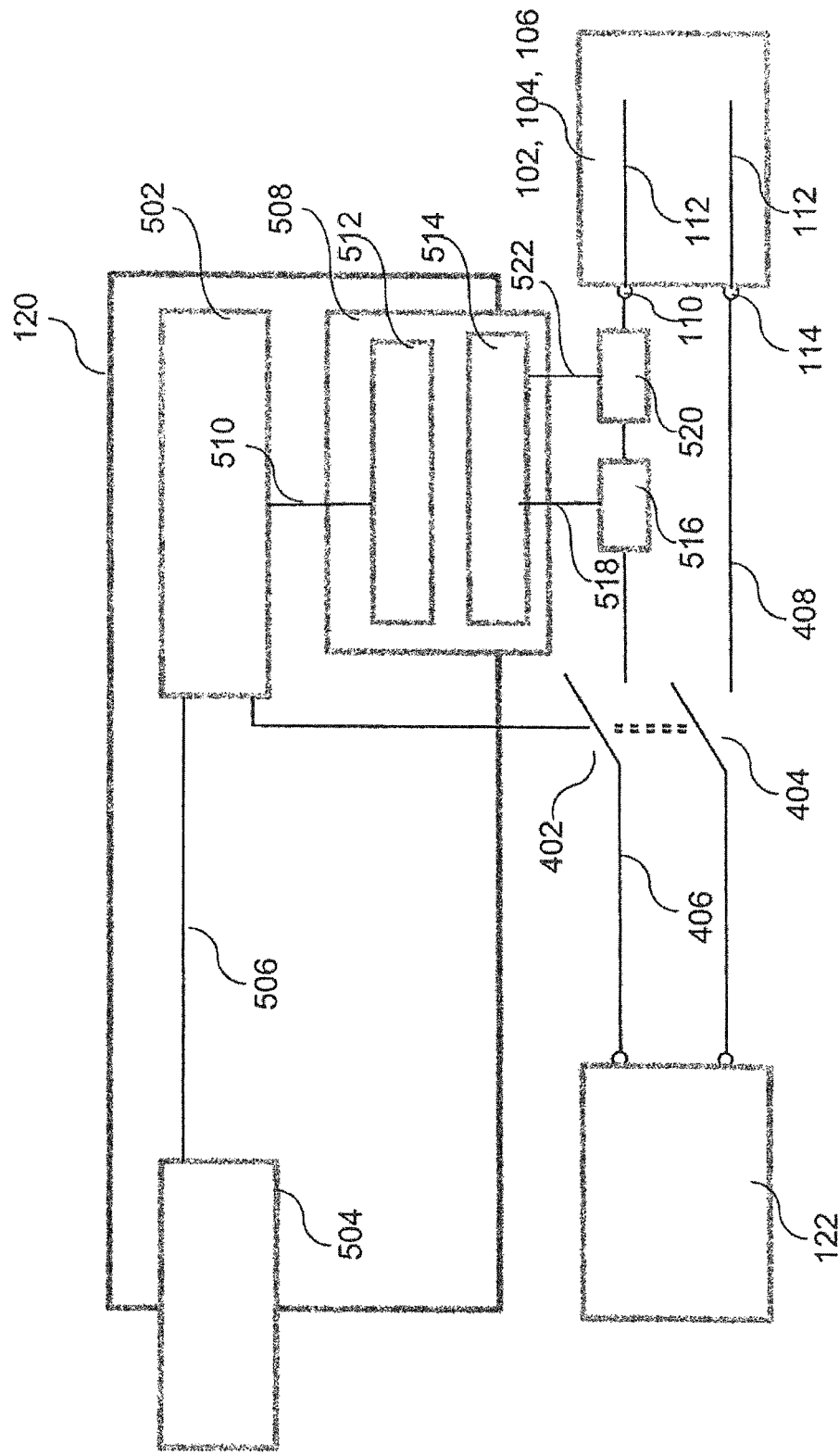
FIG. 5 shows part of a photovoltaic module arrangement in accordance with various embodiments.

FIG. 5 shows part of a photovoltaic module arrangement 100 in accordance with various embodiments. This part can be provided independently of or together with the embodiments illustrated in FIG. 2 and FIG. 3.

As illustrated in FIG. 5, the controller 120 has, in various embodiments, a control circuit 502. The control circuit 502 can be realized in the form of any desired logic implementation (in other words in the form of any desired logic circuit). Thus, the control circuit 502 can be implemented as hard-wired logic, alternatively as an FPGA (field programmable gate array) or as an application-specific integrated circuit (ASIC) or else as a processor with any desired realization, for example a programmable processor, such as a programmable microprocessor, for example.

In addition, a power supply 504 (for example one or more batteries or a power supply which uses at least some of the provided energy from the AC voltage grid 124 and/or from the photovoltaic modules 102, 104, 106) can be provided, which power supply can be electrically conductively connected to the control circuit 502 in order to supply power to said control circuit, for example by means of one or more supply lines 506. In various embodiments, the control circuit 502 is designed to generate a pulsating control signal (also referred to below as enable signal) for controlling at least one switching unit 116, 118 for limiting the energy flow in the series circuit including photovoltaic modules 102, 104, 106. The control circuit 502 can be connected to a control signal transmission element 508 which is likewise provided, for example by means of one or more connecting lines 510. Thus, the pulsating control signal can be designed to deactivate (open) or activate (close) the at least one switching unit 116, 118. The control signal transmission element 508 may include a first part 512 and a second part 514, which is DC-isolated from the first part. In various embodiments, the control signal transmission element 508 can be realized as an optocoupler, a plurality of optocouplers or else one or more transformers (with or without an iron core). The first part 512 is electrically conductively connected to the control circuit 502. Furthermore, the second part 514 is electrically conductively connected to a connection for connecting the controller to at least one DC voltage line, wherein the series circuit including photovoltaic modules can be connected to the DC voltage line 112.

In various embodiments, the control circuit 502 can be designed to modulate the enable signal by means of the control signal transmission element 508 onto the DC voltage line 112.

Furthermore, the controller 120 can have a switching unit simulation circuit 516, which has the same design in terms of circuitry as the at least one switching unit 116, 118. The design in terms of circuitry of the switching unit simulation circuit 516 and the switching unit(s) 116, 118 will be explained in more detail below. The switching unit simulation circuit 516 is electrically conductively connected to the second part 514 of the control signal transmission element 508, for example by means of a line 518. As illustrated, the line connects the second part 514 of the control signal transmission element 508 to an input of the switching unit simulation circuit 516. The enable signal is received by means of the input and is guided through the switching unit simulation circuit 516 in the same way as the enable signal is guided through the respective switching unit 116, 118. An output of the switching unit simulation circuit 516 is designed to provide an output signal, which is provided in response to the reception of the pulsating control signal. The output of the switching unit simulation circuit 516 is also electrically conductively connected to a measuring device 520, for example having a current measurement circuit or a voltage measurement circuit. The measuring device 520 is designed to measure the output signal, and therefore, as illustrated, the enable signal which is guided through the for example single-pole switching unit simulation circuit 516. As illustrated, this means that it is now possible, by means of the measuring device 520, to determine the quality of the coupling-in (i.e. for example the attenuation or distortion) of the enable signal. As illustrated, therefore, a controller-internal coupling-in simulation of the enable signal, generally of any desired control signal modulated onto the DC line 112, is achieved.

The measuring device 520 is for its part electrically conductively connected to the second part of the control signal transmission element 508 (for example by means of a further line 522) and is designed to encode the measurement result, for example in the form of a measurement result signal which represents the measurement result, for example the measured value(s) which has/have been determined by the measuring device 520, and to transmit this measurement result to the control circuit 502 by means of the control signal transmission element 508.

The control circuit 502 receives the measurement result signal(s), evaluates said signal(s) or determines from said signal(s) how the pulsating control signal would have to change in terms of its signal characteristic, for example in terms of its signal frequency and/or signal amplitude, in order to improve the coupling-in of the pulsating control signal onto the DC voltage line 112. In other words, the control circuit 502 is designed in such a way that it changes the pulsating control signal in terms of its signal frequency and/or its signal amplitude depending on the output signal, with the result that the coupling-in of the pulsating control signal onto the at least one DC voltage line 112 is regulated to a predetermined reference variable.

Therefore, the disconnection system can be integrated in series in the photovoltaic arrangement 100 and can thus be adjusted to the respective photovoltaic module string length and photovoltaic module parameters. Furthermore, in various embodiments, a retrofit variant for the controller for an already existing photovoltaic arrangement (without controller in accordance with the various embodiments) is provided.

In other words, the enable signal generated by the control circuit 502 is modulated onto the photovoltaic module string with DC isolation. Circuit simulation of the switching unit 116, 118 is located in the control unit, with the result that the coupling-in of the enable signal at this circuit simulation can still be measured within the control unit 120 by the control circuit 502, more precisely by the measuring device 520. In this case, the enable signal can be varied by means of the control circuit 502 in terms of its frequency and amplitude in such a way that coupling-in of the enable signal which is as optimum as possible is achieved (as illustrated a control loop is thus formed).

In this way, signal matching of the control signal, for example the enable signal, to the photovoltaic module impedance is enabled.

Figure 6:
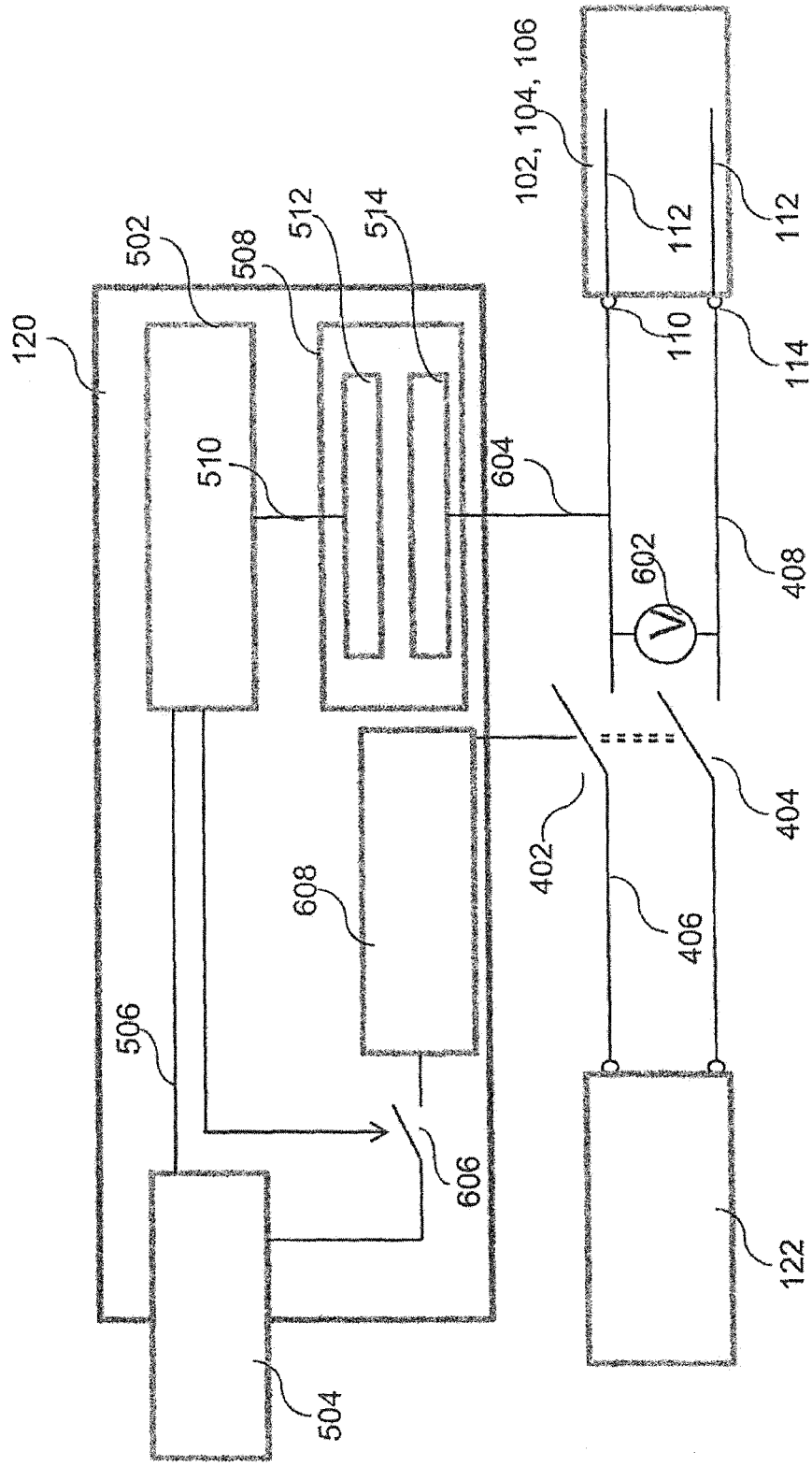
FIG. 6 shows part of a photovoltaic module arrangement in accordance with various embodiments.

FIG. 6 shows part of a photovoltaic module arrangement 100 in accordance with various embodiments. This part can be provided independently of or together with the embodiments illustrated in FIG. 2 and FIG. 3.

The components which are included in the embodiments illustrated in FIG. 6 can be provided in combination with the components which are included in the embodiments illustrated in FIG. 5, or independently of at least some of these, for example independently of the above-described load matching. Those components which are identical to the components in the embodiments in FIG. 5 have been provided with the same reference symbols in the text which follows and will not be described again.

The controller 120 can have, for example, a voltage measurement circuit 602, for example a voltmeter 602, which is connected between the two lines 406, 408 and therefore measures the electrical potential provided by the photovoltaic modules 102, 104, 106, in other words the photovoltaic module string voltage.

The photovoltaic module string voltage(s) can be measured continuously or at predetermined time intervals or at any desired regular or irregular time intervals. The voltage measurement circuit 602 is electrically conductively connected to the second part of the control signal transmission element 508 (for example by means of line 604) and, by means of said control signal transmission element, transmits the measured photovoltaic module string voltage value(s) to the control circuit 502 with DC isolation. The control circuit 502 can be designed to determine, using the received photovoltaic module string voltage value(s), whether the switching units 116, 118 should remain closed or should be opened.

The voltage measurement circuit 602 can be designed, for example, in such a way that a high-resistance measurement of the photovoltaic module string voltage is performed by means of the voltage measurement circuit 602, which is DC-isolated from the control circuit 502, as an implementation of a measuring device. The measured photovoltaic module string voltage value(s) (generally of a determined measurement signal which represents the measured photovoltaic module string voltage value(s)) are transmitted to the control circuit 502, for example optically (for example by means of an optocoupler) or inductively (for example by means of a transformer).

Thus, for example, the measurement of the photovoltaic module string voltage can take place over the discharging time of a capacitor charged by the photovoltaic module string voltage. The control and measured value transmission can take place via an optocoupler.

If, for example, the control circuit 502 determines that the photovoltaic module string voltage value(s) is/are above a threshold value (for example greater than 50 V), the control circuit 502 can generate a control signal and therefore close an isolating device switch 606 in order to connect an isolating device 608 likewise contained in the controller 120 to the power supply 504 and thus activate said isolating device. The isolating device 608 can be designed to switch the at least one switch 402, 404 so as to DC-isolate the at least one photovoltaic module from the DC voltage line 112.

As an alternative or in addition, the control circuit 502 can be designed to determine, using the received photovoltaic module string voltage value(s), whether the photovoltaic modules are generating any energy at all at that time. If, for example, the photovoltaic module string voltage value(s) fall(s) below a predetermined threshold value, the control circuit 502 can be designed to deactivate one or more components of the controller 120 (in other words to deenergize them) and to switch them over to one or more rest states or energy-saving states (possibly stepwise) in order to thus consume less energy, which in such a case needs to be provided by the power supply 504. It should be noted that the control unit 120 does require a power supply 504 in order to generate the enable signal, for example, and to modulate or impress this enable signal onto the DC voltage line 112.

In the case of the high-resistance interruption, the photovoltaic module string voltage is still present at the inverter 122, with the result that the voltage measurement can take place permanently. If a defined limit voltage is reached, the control unit 120 switches the photovoltaic module string to be active again, as is illustrated. In various embodiments, the limit voltage can be in a range of from approximately 10 V to approximately 300 V, for example in a range of from approximately 30 V to approximately 200 V, for example in a range of from approximately 100 V to approximately 150 V.

In the case of DC isolation, the disconnection can be interrupted, for example, after a defined time and the voltage measurement can again be performed on the photovoltaic module string which is now active again.

Owing to the measurement of the photovoltaic module string voltage, in general the operating state of the photovoltaic arrangement 100 can thus be determined, with the result that, for example, time periods in which the photovoltaic arrangement 100 does not generate any electrical energy (for example at night or when covered with snow) are identified. In this case, for example, components for the signal generation and/or the actuators of the isolation at all poles can be disconnected. As a result, the total energy consumption of the controller 120 is markedly reduced.

As has been described above, the signal measurement can likewise be used to detect arcs in the photovoltaic arrangement 100. If a characteristic signal is identified, the controller 120 disconnects, for example, the signal generation of the enable signal (in the case of an active signal for activating the switching units 116, 118), the photovoltaic module string voltage breaks down and the arc is quenched.

When reconnecting the photovoltaic arrangement 100, tests can again be performed for arcs. If appropriate, the controller 120 can log and signal the arc. The identification of an arc takes place, for example, by a circuit which identifies high-frequency components in the DC path (photovoltaic module string) of the photovoltaic arrangement 100 (for example by means of the voltage measurement circuit 602 or by means of the measuring device 520).

As an alternative to this, as a precautionary measure, an arc interruption can be provided instead of arc identification. For this purpose, a short disconnection pulse is realized cyclically in the controller 120, for example. The disconnection pulse should be long enough to cause an existing arc to quench and is in the milliseconds range. The repetition rate of the cyclic disconnection pulses is in the seconds range. A short repetition rate of the cyclic disconnection pulses shortens the arc burning duration, but is at the expense of the yield of the photovoltaic arrangement 100.

Figure 7:
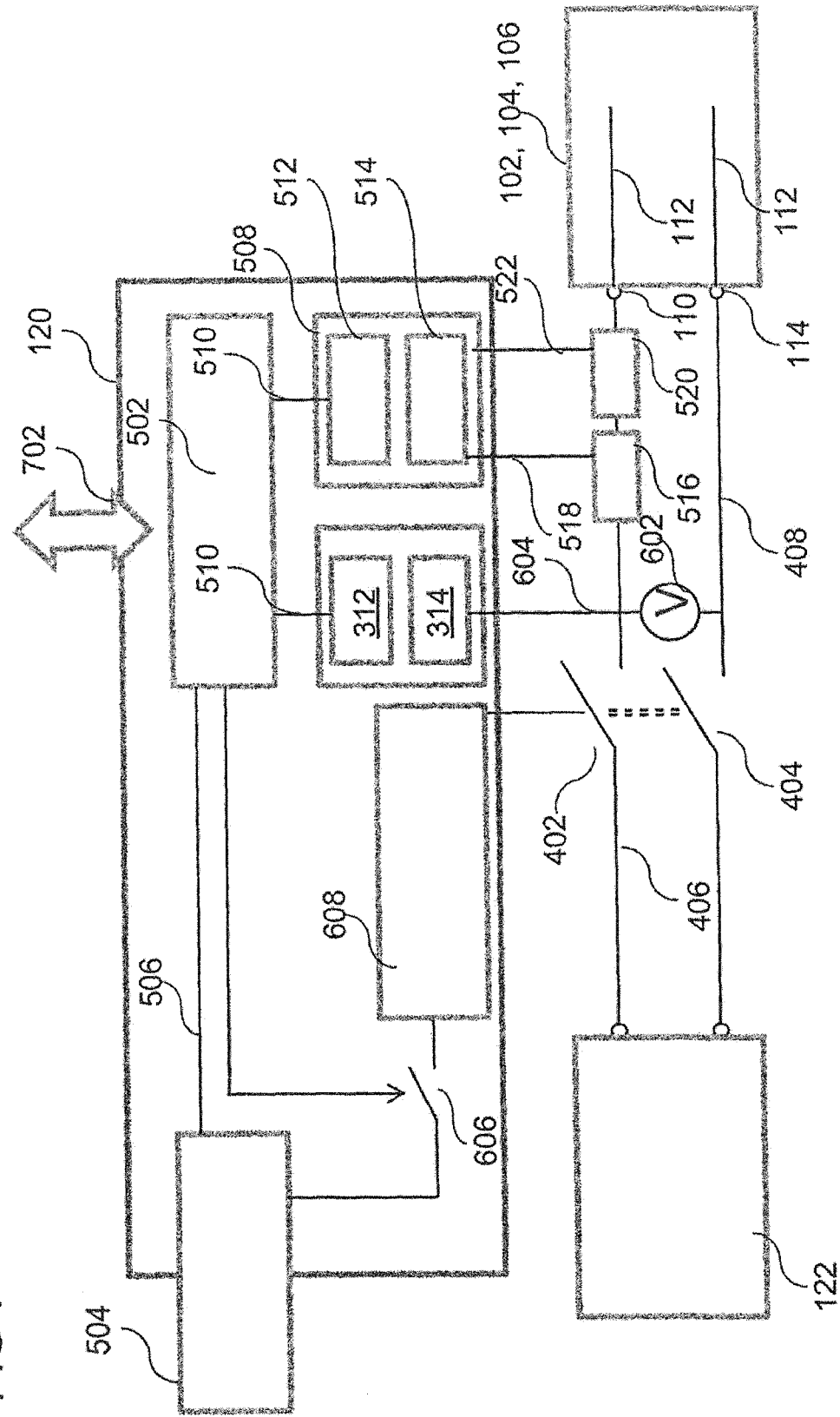
FIG. 7 shows part of a photovoltaic module arrangement in accordance with various embodiments.

FIG. 7 shows a part of a photovoltaic module arrangement 100 in accordance with various embodiments.

In various embodiments, as illustrated in FIG. 7, the components of the embodiments in FIG. 5 and FIG. 6 can be combined with one another.

Optionally, at least one external communication interface 702 for communication with an external device can be provided. The communication interface 702 can be electrically conductively connected to the controller 120. In this way, the controller 120 can respond to external signals or send signals externally. External signals can come from a fire alarm system or an emergency stop switch or another external device, for example. Remote shutdown corresponding to capacity utilization of the grid is also conceivable. Signals sent externally can signal the status of the photovoltaic arrangement 100, for example, with the result that the disconnection can be made clear.

For example, the communication interface 502 can be designed to receive or send signals with a controller-external device.

Furthermore, it is possible to enable theft monitoring with the controller 120. If the photovoltaic module string is interrupted, it is not possible to modulate a signal onto the DC line 112. The modulation measurement can establish this and can trigger an alarm.

In various embodiments, one or more of the following reasons can be provided as disconnection reasons, i.e. for deactivating the switching units 116, 118 or for isolating the DC lines 112 at all poles:

AC grid isolation:
If the controller 120 is without a voltage, no signal generation of the enable signal takes place, whereby the switches of the switching units 116, 118 are opened.

Night-time disconnection:
If the photovoltaic module string voltage is below a limit voltage, no signal generation of the enable signal takes place, whereby the switches of the switching units 116, 118 are opened.

External manual switch:
No signal generation of the enable signal takes place, whereby the switches of the switching units 116, 118 are opened.

External signal (for example from a fire alarm system):
No signal generation of the enable signal takes place, whereby the switches of the switching units 116, 118 are opened.

Arc identified:
No signal generation of the enable signal takes place, whereby the switches of the switching units 116, 118 are opened. Thereupon, the arc collapses. After a certain amount of time, a restart can be provided, with renewed checking for an arc being possible.

In the text which follows, possible configurations of the switching units 116, 118 are described. However, it should be noted that other configurations of the switching units 116, 118 can readily be provided.

In various embodiments, a controller for a photovoltaic module arrangement is provided. The photovoltaic module arrangement may include: a control circuit for generating a pulsating control signal for controlling at least one switching unit for limiting the energy flow in a series circuit including photovoltaic modules; a control signal transmission element, which includes a first part and a second part, which are DC-isolated from one another, wherein the first part is electrically conductively connected (in other words galvanically connected) to the control circuit, and wherein the second part is electrically conductively connected (in other words galvanically connected) to a connection for connecting the controller to at least one DC voltage line, wherein the series circuit including photovoltaic modules is connected to the DC voltage line; a switching unit simulation circuit, which is electrically conductively connected to the second part of the control signal transmission element and which has the same design in terms of circuitry as the at least one switching unit, wherein an input of the switching unit simulation circuit is designed to receive the pulsating control signal, and wherein an output of the switching unit simulation circuit is designed to provide an output signal which is provided in response to the reception of the pulsating control signal; a measuring device, that is designed to measure the output signal; wherein the control circuit is coupled to the measuring device and is also designed in such a way that it changes the pulsating control signal in terms of its signal frequency and/or its signal amplitude depending on the output signal, with the result that the coupling-in of the pulsating control signal onto the at least one DC voltage line is regulated to a predetermined reference variable.

As illustrated, in the event of a fault or during maintenance, a photovoltaic system can be operated in such a way that it operates in a range which is not hazardous to humans. Thus, for example, the value of the current in the at least one DC line can be reduced to a range of approximately 0 mA to approximately 30 mA. In addition, for example, the value of the voltage in the at least one DC line can be reduced to a range of from approximately 0 V to approximately 60 V.

Thus, in various configurations, a control unit can control one or more switching units, which connect or route a series circuit including photovoltaic modules (module string), in such a way that the electrical voltages and/or electrical currents produced by the photovoltaic modules are in a range which is not hazardous to humans in the event of disconnection of the photovoltaic system. This can be achieved, for example, by virtue of photovoltaic modules being short-circuited or isolated by one or more switching units.

In the case of the isolation of the individual photovoltaic modules, DC isolation can firstly be produced by the switching units, for example. In a further embodiment, the photovoltaic module string can be divided by high-resistance elements in such a way that, although the total photovoltaic module string voltage is still present at the switching unit, the current intensity is reduced to a noncritical range by high-resistance adapter plugs, with the result that maintenance, installation or quenching work can be performed.

In this case the control can take place by generating a signal which is modulated onto the DC voltage line and is identified by the switching unit. When a signal is present, the switch is closed and the photovoltaic system is brought into operation.

In one configuration, the switching unit simulation circuit can be a single-pole switching unit simulation circuit.

In yet another configuration, the controller can also have an inverter connection for connecting the controller to an inverter.

In yet another configuration, the pulsating control signal can be designed to deactivate or activate the at least one switching unit.

In various embodiments, the at least one switching unit is designed to interrupt the direct current flow in the photovoltaic arrangement. Alternatively, the at least one switching unit can be designed to short-circuit the photovoltaic modules.

In yet another configuration, the controller may also include an isolating device, which is designed to switch at least one switch for DC-isolating at least one photovoltaic module from the DC voltage line; wherein the control circuit is also designed to generate an additional control signal for controlling the isolating device.

In yet another configuration, the isolating device can be designed to switch at least one switch for DC-isolating, at all poles, at least one photovoltaic module from the DC voltage line.

In yet another configuration, the controller may also include a voltage measurement device, which is designed to measure an electrical voltage which is present on the at least one DC voltage line.

In yet another configuration, the voltage measuring device can be designed for the potential-free measurement of the electrical voltage.

In yet another configuration, the control circuit can be DC-decoupled from the voltage measuring device and can also be designed to receive a value representing the measured electrical voltage, to determine, using the value, an operating state of the photovoltaic module arrangement, and to generate the additional control signal depending on the determined operating state of the photovoltaic module arrangement.

In yet another configuration, the control circuit can also be designed to generate the additional control signal in such a way that the isolating device isolates the at least one photovoltaic module from the DC voltage line when the measured electrical voltage is below a predetermined threshold value and electrically conductively connects the at least one photovoltaic module to the DC voltage line when the measured electrical voltage is above the predetermined threshold value.

In yet another configuration, the control circuit can also be designed to determine, using the measured signal, an arc in the photovoltaic module arrangement and, when an arc is determined, to generate the additional control signal in such a way that the isolating device isolates the at least one photovoltaic module from the DC voltage line.

In yet another configuration, the controller may also include a communication interface, which is coupled to the control circuit and is designed to receive or send signals with a controller-external device.

In yet another configuration, the controller of the control circuit can also be designed to generate an alarm signal when the measured electrical voltage is below a predetermined threshold value.

In yet another configuration, the controller of the control circuit can also be designed to generate a control signal in such a way that the isolating device isolates the at least one photovoltaic module from the DC voltage line when an external signal is received. The external signal can be sent, for example, by a fire alarm system which has detected a fire or by the grid operator which establishes an overload of the grid, for example, and disconnects the photovoltaic module arrangement. In various embodiments, a photovoltaic module arrangement is provided. The photovoltaic module arrangement may include a plurality of photovoltaic modules; at least one DC voltage line, to which the plurality of photovoltaic modules are connected; and a controller, which is coupled to the DC voltage line, as has been described above and will also be described in more detail below.

In one configuration, the photovoltaic module arrangement may also include an inverter, which is electrically conductively connected to the DC voltage line.

In yet another configuration, the photovoltaic module arrangement may also include at least one switch for isolating at least one photovoltaic module from the DC voltage line.

In yet another configuration, the switch can be designed to isolate, at all poles, at least one photovoltaic module from the DC voltage line.

In various embodiments, an inverter for a photovoltaic module arrangement is provided. The inverter may include a controller, as has been described above and will also be described in more detail below.

In various embodiments, a control unit for controlling interruption elements (i.e. for example one or more switching units) can be provided, which control unit divides a module string into subsegments in such a way that the direct current produced by the photovoltaic system is in a range which is not hazardous to humans.

In various configurations, the control unit can have one or more of the following properties, in other words one or more of the following properties can be implemented in the control unit:
  possibility of DC isolation, at all poles, of the system;
  measurement of the string voltage;
  night-time disconnection for reducing operating costs;
  matching of the disconnection system to various module impedances;
  identification of arcs by analysis of the signal on the DC voltage line and interruption of the arcs by interruption of the DC circuit;
  arc prevention: interruption of arcs by the cyclic short-term interruption of the DC circuit; and/or
  theft prevention;
  sending and receiving and evaluating of signals to and from the outside;
  generator field remote disconnection.

Various embodiments enable improved coupling-in of a control signal for controlling a switching unit for limiting the energy flow in a series circuit including photovoltaic modules.

Various embodiments enable one or more of the following functions:
  isolation, at all poles, of the generator field from the inverter;
  measurement of the string voltage;
  measurement of the signal on the powerline/signal matching to string impedance;
  detection of arcs and/or
  saving energy.

In various embodiments, a controller for a photovoltaic module arrangement is provided, said controller including: a control circuit for generating a control signal for controlling at least one switching unit for limiting the current flow in a series circuit including photovoltaic modules, which are connected to a DC voltage line; a simulation circuit which simulates at least one switching unit; wherein the simulation circuit receives a control signal and provides an output signal in response to the control signal; and wherein the control circuit changes the control signal in terms of its signal frequency and/or its signal amplitude depending on the output signal.

In one configuration, the controller may also include: a transformer, which has a first part and a second part, which are DC-isolated from one another, wherein the first part is galvanically connected to the control circuit, and wherein the second part is galvanically connected to the simulation circuit.

In yet another configuration, the control circuit can be designed to generate a pulsating control signal.

In yet another configuration, the simulation circuit may include the same design in terms of circuitry as the at least one switching unit.

In yet another configuration, the controller may also include: an isolating device, which is designed to switch at least one switch for DC-isolating at least one photovoltaic module from the DC voltage line; wherein the control circuit can also be designed to control the isolating device.

In yet another configuration, the isolating device can be designed to DC-isolate, at all poles, at least one photovoltaic module from the DC voltage line.

In yet another configuration, the controller may also include a voltmeter for measuring an electrical voltage, which is present at the at least one DC voltage line.

In yet another configuration, the voltmeter can perform potential-free measurement of the electrical voltage.

In yet another configuration, the control circuit can be DC-decoupled from the voltmeter and can determine, using the measured electrical voltage, an operating state of the photovoltaic module arrangement.

In yet another configuration, the control circuit can isolate the at least one photovoltaic module from the DC voltage line when the measured electrical voltage is below a predetermined threshold value and electrically conductively connect the at least one photovoltaic module to the DC voltage line when the measured electrical voltage is above the predetermined threshold value.

In yet another configuration, the control circuit can determine, using the measured electrical voltage, an arc in the photovoltaic module arrangement and, when an arc is determined, isolate the at least one photovoltaic module from the DC voltage line.

In yet another configuration, the control circuit can isolate the at least one photovoltaic module from the DC voltage line cyclically for a short period of time, with the result that an arc is interrupted.

In yet another configuration, the controller may also include a communication interface which is coupled to the control circuit for communicating with a controller-external device.

In yet another configuration, the control circuit can also generate an alarm signal when the measured electrical voltage is below a predetermined threshold value.

In various embodiments, a photovoltaic module arrangement is provided, said photovoltaic module arrangement including: a plurality of photovoltaic modules; at least one DC voltage line, to which the plurality of photovoltaic modules is connected; and a controller which is coupled to the DC voltage line, as is described above.

In one configuration, the photovoltaic module arrangement may also include at least one switch for isolating at least one photovoltaic module from the DC voltage line.

In yet another configuration, the switch can be designed to isolate, at all poles, at least one photovoltaic module from the DC voltage line.

In various embodiments, an inverter for a photovoltaic module arrangement is provided, said inverter including a controller, as is described above.

In various embodiments, a single-pole switching unit for limiting the energy flow in a series circuit comprising photovoltaic modules by a pulsating control signal present on at least one DC line is provided. The switching unit may include a switching element, which is designed to reduce the current flow in the at least one DC line of the photovoltaic modules; a transmission element, which is designed to couple out an electrical control signal present on the DC line and to control the switching element merely with the energy of the coupled-out control signal; and a coupling element, which is arranged in parallel with the switching element and which conducts the control signal through the switching unit when the switching element is nonconducting.

As can be seen, in various embodiments the DC path is interrupted at or between each photovoltaic module of a photovoltaic module string. Thus, module voltages cannot be added to give a photovoltaic module string voltage which could pose a risk to humans, for example in the event of a fire.

Thus, in various embodiments, a switching unit for interrupting the direct current flow in a series circuit including photovoltaic modules is provided by way of example, wherein the control signal for interrupting the DC path is guided via the DC line to be interrupted.

In one configuration, the switching element is designed to reduce the current flow in the at least one DC line of the photovoltaic modules to a value which is nonhazardous to humans. It is thus possible, for example, for the value of the current in the at least one DC line to be reduced to a range of approximately 2 mA to approximately 10 mA. In addition, for example, the value of the voltage in the at least one DC line can be reduced to a range of approximately 60 V to approximately 120 V.

In yet another configuration, the switching element may include at least one semiconductor switching element, for example one or more transistors, for example one or more field-effect transistors.

In yet another configuration, the switching unit may also include a rectifier element, which is connected between the transmission element and a control connection of the switching element and is designed to rectify the control signal and to provide the rectified signal at the control connection of the switching element.

In yet another configuration, the coupling element may include at least one capacitor.

In yet another configuration, the switching unit may also include a protection element which is connected in parallel with the switching element and is designed for electrically protecting the switching element. The protection element may include a protection diode or a plurality of protection diodes.

In various embodiments, a photovoltaic module arrangement is provided, said photovoltaic module arrangement including a plurality of series-connected photovoltaic modules and at least one DC line for connecting the photovoltaic modules. Furthermore, the photovoltaic module arrangement may include at least one switching unit, which is connected into the DC line, as has been described above and will be explained in more detail below.

In various embodiments, a photovoltaic module is provided, said photovoltaic module including a plurality of photovoltaic cells; a junction box for connecting at least two DC lines; and a switching unit, as has been described above and will be explained in more detail below. The switching unit is built into the junction box.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A single-pole switching unit for limiting the energy flow in a series circuit comprising photovoltaic modules by a pulsating control signal present on at least one DC line, the switching unit comprising:
   a switching element, which is designed to reduce the current flow in the at least one DC line of the photovoltaic modules;
   a transformer element, which is designed to couple out an electrical control signal present on the DC line and to control the switching element merely with the energy of the coupled-out control signal; and
   a coupling element, which is arranged in parallel with the switching element and which conducts the control signal through the switching unit when the switching element is nonconducting.

2. The single-pole switching unit according to claim 1, wherein the switching element is designed to reduce the current flow in the at least one DC line of the photovoltaic modules to a value which is nonhazardous to humans.

3. The single-pole switching unit according to claim 1, wherein the switching element has at least one semiconductor switching element.

4. The single-pole switching unit according to claim 1, further comprising:
   a rectifier element, which is connected between the transformer element and a control connection of the switching element and is designed to rectify the control signal and to provide the rectified signal at the control connection of the switching element.

5. The single-pole switching unit according to claim 1, wherein the coupling element comprises at least one capacitor.

6. The single-pole switching unit according to claim 1, further comprising:
   a protection element which is connected in parallel with the switching element and is designed for electrically protecting the switching element.

7. The single-pole switching unit according to claim 6, wherein the protection element comprises a protection diode.

8. A photovoltaic module arrangement, comprising:
   a plurality of series-connected photovoltaic modules;
   at least one DC line for connecting the photovoltaic modules;
   at least one switching unit being connected into the DC line, the at least one switching unit comprising:
      a switching element, which is designed to reduce the current flow in the at least one DC line of the photovoltaic modules;
      a transformer element, which is designed to couple out an electrical control signal present on the DC line and to control the switching element merely with the energy of the coupled-out control signal; and
      a coupling element, which is arranged in parallel with the switching element and which conducts the control signal through the switching unit when the switching element is nonconducting.

9. The photovoltaic module arrangement according to claim 8,
   wherein the switching element is designed to reduce the current flow in the at least one DC line of the photovoltaic modules to a value which is nonhazardous to humans.

10. The photovoltaic module arrangement according to claim 8,
    wherein the switching element has at least one semiconductor switching element.

11. The photovoltaic module arrangement according to claim 8, further comprising:
    a rectifier element, which is connected between the transformer element and a control connection of the switching element and is designed to rectify the control signal and to provide the rectified signal at the control connection of the switching element.

12. The photovoltaic module arrangement according to claim 8,
    wherein the coupling element comprises at least one capacitor.

13. The photovoltaic module arrangement according to claim 8, further comprising:
    a protection element which is connected in parallel with the switching element and is designed for electrically protecting the switching element.

14. The photovoltaic module arrangement according to claim 13,
    wherein the protection element comprises a protection diode.

15. A photovoltaic module, comprising:
    a plurality of photovoltaic cells;
    a junction box for connecting at least two DC lines; and
    a switching unit being built into the junction box, the switching unit comprising:
       a plurality of series-connected photovoltaic modules;
       at least one DC line for connecting the photovoltaic modules;
       at least one switching unit being connected into the DC line, the at least one switching unit comprising:
       a switching element, which is designed to reduce the current flow in the at least one DC line of the photovoltaic modules;
       a transformer element, which is designed to couple out an electrical control signal present on the DC line and to control the switching element merely with the energy of the coupled-out control signal; and
       a coupling element, which is arranged in parallel with the switching element the switching element and which conducts the control signal through the switching unit when the switching element is nonconducting.

16. The photovoltaic module according to claim 15,
    wherein the switching element is designed to reduce the current flow in the at least one DC line of the photovoltaic modules to a value which is nonhazardous to humans.

17. The photovoltaic module according to claim 16,
    wherein the switching element has at least one semiconductor switching element.

18. The photovoltaic module according to claim 16, further comprising:

a rectifier element, which is connected between the transformer element and a control connection of the switching element and is designed to rectify the control signal and to provide the rectified signal at the control connection of the switching element.

19. The photovoltaic module according to claim 16, wherein the coupling element comprises at least one capacitor.

20. The photovoltaic module arrangement according to claim 15, further comprising:
a protection element which is connected in parallel with the switching element and is designed for electrically protecting the switching element.

\* \* \* \* \*